United States Patent [19]

Ohneda et al.

[11] Patent Number: 5,033,344
[45] Date of Patent: Jul. 23, 1991

[54] PIPE CUTTING APPARATUS

[75] Inventors: Noboru Ohneda, Oyamashi; Shunta Ushioda, Yukishi; Haruo Arima; Ichiro Hashimoto, both of Oyamashi; Denziro Kaneko, Tochigishi; Kazuo Sugiyama, Shimodateshi; Tsuguo Fukazawa, Oyamashi; Teruo Tachi, Kasamashi; Takashi Mukasa, Yukishi, all of Japan

[73] Assignee: Showa Aluminum Kabushiki Kaisha, Japan

[21] Appl. No.: 613,998

[22] Filed: Nov. 14, 1990

[30] Foreign Application Priority Data

Nov. 24, 1989 [JP] Japan ................................. 1-305843

[51] Int. Cl.5 .............................................. B26D 7/06
[52] U.S. Cl. ....................................... 83/262; 83/268; 83/467.1; 83/468.6; 83/485
[58] Field of Search ................. 83/262, 269, 268, 282, 83/467.1, 468.2, 468.7, 485, 54, 181, 182, 183, 184, 186, 198, 468.6

[56] References Cited

U.S. PATENT DOCUMENTS

| 4,082,022 | 4/1978 | Horn et al. | 83/181 |
| 4,631,998 | 12/1986 | Borzym | 83/183 |
| 4,785,550 | 11/1988 | Wilkins | 83/468.2 |
| 4,930,379 | 6/1990 | Takaniemi | 83/54 |

Primary Examiner—Frank T. Yost
Assistant Examiner—Allan M. Schrock

[57] ABSTRACT

A metallic pipe-cutting apparatus is constructed to cut elongate metallic pipes such as aluminum pipes into shorter pipes of a predetermined length, and comprises a main body, a chuck disposed rearwardly of the main body so as to hold trailing ends of the elongate metallic pipes, and a supporter disposed forwardly of the main body, with the main body interposed between the chuck and the supporter. The supporter comprises supporting pins which are to be inserted in leading ends of the pipes whose trailing ends are clamped by the chuck, so that the pipes clamped at their both ends are moved intermittently a predetermined distance so as to be successively cut into the predetermined length, with their outer peripheral surfaces not being scratched or flawed due to sliding contact with clampers or other members.

5 Claims, 3 Drawing Sheets

PIPE CUTTING APPARATUS

BACKGROUND OF THE INVENTION

1. Field of the Invention

The invention relates to a metallic pipe-cutting apparatus used to continuously cut elongate metallic pipes such as aluminum pipes to manufacture shorter pipes of a predetermined length.

The word "forward" in this specification means a direction in which the elongate metallic pipes are transported.

2. Description of Prior Art

A prior art pipe-cutting apparatus in general comprises, as shown in FIG. 7, a support roller 82 disposed rearwardly of a main body 81 of the apparatus. A chuck 83 is interposed between the main body 81 and the support roller 82 so as to reciprocate therebetween. An elongate pipe 84 is intermittently moved a desired distance towards the main body 81 of the pipe-cutting apparatus which cuts the pipe 84 in a continuous manner. The main body 81 comprises a cutting blade 85 and a clamper 86.

The chuck 83 in the prior art apparatus repeatedly grips the pipe 84 at different portions thereof so that predetermined lengths of the pipe 84 can be delivered one after another to the pipe-cutting apparatus. Therefore, many scratches or damages are produced by the chuck 83 on an outer peripheral surface of the pipe 84.

Further, the support roller 82 also causes scratches or contact flaws on the surface of the pipe 84 while it is transported being supported on the roller.

Those scratches or flaws will be very serious defects if the pipe 84 produced by the drawing process is to be cut to make photosensitive drums which bear thereon a photosensitive layer such as selenium layer or organic photoconductive layer to be installed in the electronic copiers, laser printers or the likes. Consequently, the yield of acceptable products has been not satisfactorily high.

OBJECTS AND SUMMARY OF THE INVENTION

Accordingly, a primary object of the invention which was made to resolve the abovementioned problems in the prior art apparatuses is to provide a metallic pipe-cutting apparatus used to continuously cut elongate metallic pipes such as aluminum pipes to manufacture shorter pipes of a predetermined length, in such a manner that the pipes suffer no scratch or flaw.

Other objects and advantages of the invention will become apparent from the description given below on embodiments referring to the drawings.

The primary object will be achieved in the invention which provides a metallic pipe-cutting apparatus comprising a main body including a pair of forward and rearward clampers which are disposed forwardly and rearwardly of a cutting blade, respectively, a chuck adapted to hold trailing ends of elongate metallic pipes and disposed rearwardly of the main body and movably fore and aft, and a supporter disposed forwardly of the main body so as to face the chuck with the main body interposed between the chuck and the supporter, the supporter being movable fore and aft and including supporting pins which protrude rearward so as to be inserted in leading ends of the metallic pipes when moved rearward from their forward home position. These members in the apparatus are controlled such that the supporter is actuated to shift the supporting pins rearward from their home position to their pipe-supporting position while the metallic pipes are held in place between the chuck and the rearward clamper. Subsequently, the rearward clamper is operated to come out of contact with outer surfaces of the pipes, and thereafter the chuck is moved forward a predetermined distance. Finally, the clampers cooperate to hold the pipes so as to allow the cutting blade to cut the pipes.

As will be apparent already, principal members of the supporter are operated to move the supporting pins rearward from the home position so that the pins are inserted into the leading ends of the elongate metallic pipes which are held at that time between the chuck and the rearward clamper. The rearward clamper is then operated to become apart from the outer peripheral surfaces of the metallic pipes. The pipes are thus supported by the chuck at their trailing ends and by the supporter at their leading ends. The chuck is subsequently caused to advance the predetermined distance with the pipes sustained between the chuck and the supporter. Consequently, the leading ends of the pipes will be positioned beyond the cutting blade the distance corresponding to a predetermined cut length. Next, the pipes are tightly held by both of the forward and rearward clampers so as to be cut by the cutting blade, at the pipes' portions near their leading ends. After that, the chuck and the rearward clamper hold again the remaining portions of the metallic pipes so that the operations mentioned above may be repeated to cut the pipes in a sequential manner.

DETAILED DESCRIPTION OF PREFERRED EMBODIMENTS

Figure 1:
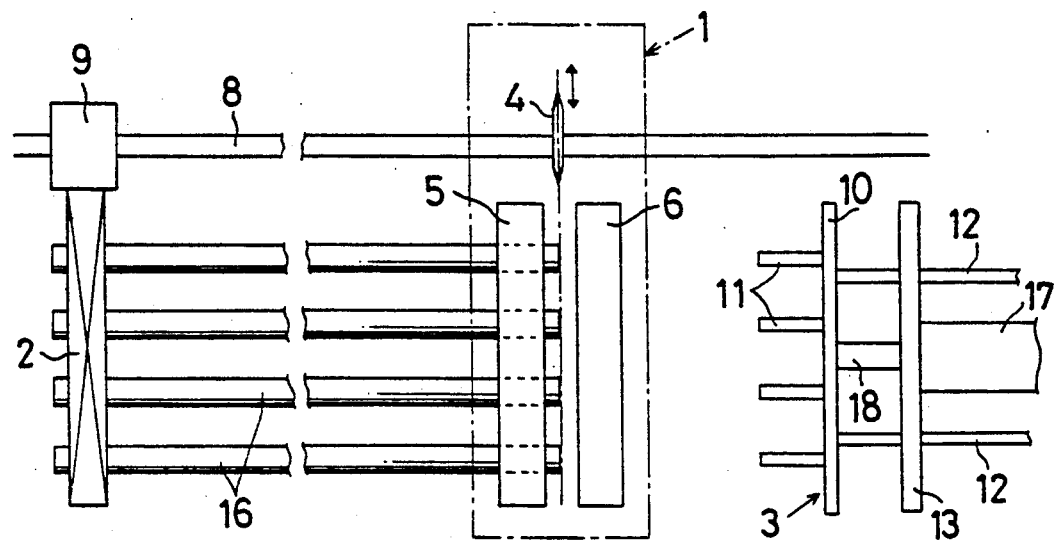
FIG. 1 in the accompanying drawings is a plan view of a metallic pipe-cutting apparatus in an embodiment of the invention.

Embodiments of the invention will now be described in detail referring to the drawings.

The reference numeral 1 in FIG. 1 denotes a main body of a metallic pipe-cutting apparatus, with the reference numerals 2 and 3 respectively denoting a chuck and a supporter of the apparatus.

The main body 1 of the apparatus comprises a cutting blade 4, a rearward clamper 5 and a forward clamper 6, these clampers 5 and 6 being disposed rearwardly and forwardly of the blade, respectively. Elongate metallic pipes will be cut as described later by the cutting blade 4 while the pipes are sustained between the clampers 5 and 6. The rearward clamper 5 comprises a pair of upper and lower clamping members 5a and 5b, and the forward clamper 6 comprises a pair of upper and lower clamping members 6a and 6b. The clamping members in each clamper are capable of being raised and lowered in opposite directions.

The chuck 2 is movably located behind the main body 1 and fixed to a carrier 9 which is movable along and mounted on a guide rail 8 extending fore and aft. A drive mechanism (not shown) drives the chuck 2 forward towards the main body and rearward away from the main body.

A plurality of the elongate metallic pipes are arranged side by side so as to be clamped as a whole by the chuck 2 and the clampers 5 and 6.

The supporter 3 which faces the chuck 2 with the main body 1 interposed therebetween comprises a base plate 10, a plurality of supporting pins 11 fixed to a back surface of the base plate 10, and a pair of guide rods 12 fixed to both sides of a front surface of the base plate 10. The supporting pins 11 are arranged side by side and protrude rearwardly of the base plate, while the guide rods 12 protrude forwardly thereof. These guide rods 12 penetrate a fixed frame 13 so as to be slidable therethrough fore and aft, the fixed frame 13 positioned forwardly of the supporter 3. Therefore, the supporter 3 can be moved fore and aft such that the supporting pins 11 are accurately inserted in leading ends of the pipes 16 when the supporter is driven rearward from its forward home position.

A pneumatic cylinder 17 driving the supporter 3 is secured to a front surface of the fixed frame 13. A piston rod 18 of the cylinder 17 slidably penetrate the fixed frame 13 and secured to a front surface of the base plate 10 of the supporter 3, whereby the supporter is movable forward and backward.

Principal features of a control system for the metallic pipe-cutting apparatus described above are constructed such that the apparatus can work as follows. According to the control system, the supporter 3 is driven by the pneumatic cylinder 17 to shift the supporting pins 11 rearward from their forward home position so as to support the leading ends of the pipes 16 while the pipes are clamped at their forward and rearward ends by the rearward clamper 5 and the chuck 2, respectively. Then, the rearward clamper 5 is operated to come out of contact with outer surfaces of the pipes 16. Subsequently, the chuck 2 is moved forward a predetermined distance. Finally, the rearward and forward clampers 5 and 6 cooperate to hold the pipes 16 so as to allow the cutting blade 4 to cut the pipes 16. These steps will be repeated in this order. Other features of the control system will be made apparent from the following detailed description of the operation.

Figure 2:
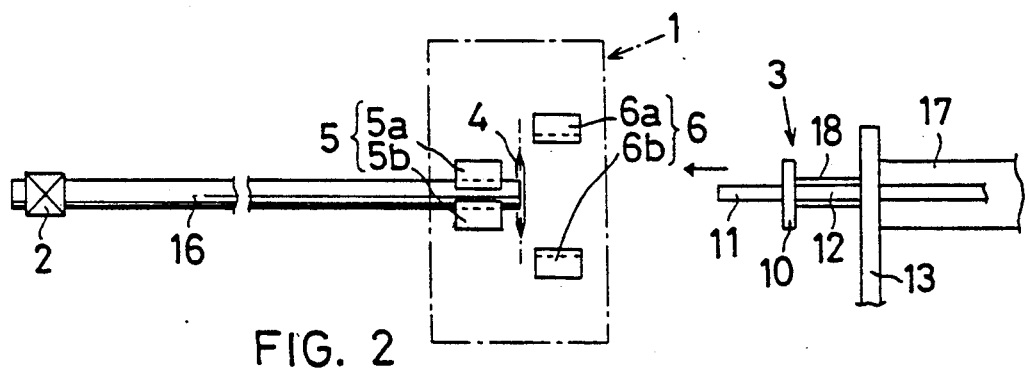
FIG. 2 is a side elevation of the apparatus.

As shown in FIG. 2, the elongate metallic pipes 16 are transported by a suitable conveying apparatus (not shown) so that they lie fore and aft between the main body 1 of the metallic pipe-cutting apparatus and the chuck 2. The rearward ends of the popes 16 are clamped by the chuck 2, and the forward ends of the pipes are clamped by the rearward clamper 5. The upper and lower clamping members 5a and 5b of the rearward clamper 5 may either cooperate to grip the pipes 16, or the lower clamping member 5b may solely support the pipes 16.

Figure 3:
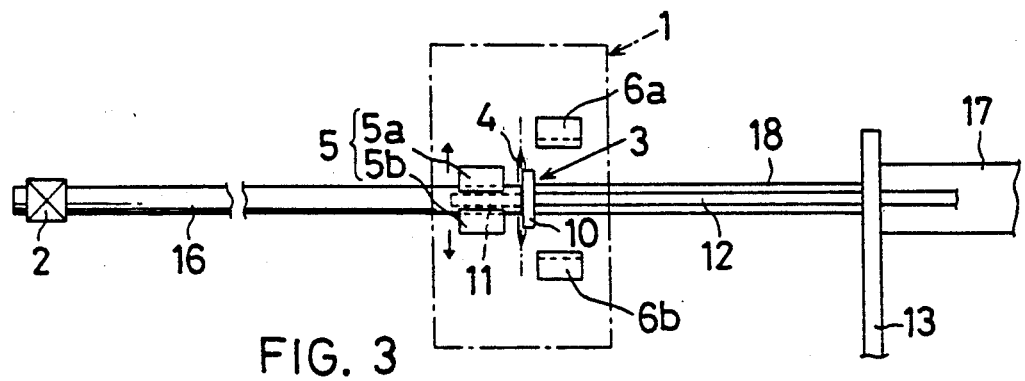
FIG. 3 is a further side elevation showing the apparatus with its supporting pins inserted in pipes.

The pneumatic cylinder 17 is actuated in this state of the apparatus so that the supporter 3 is moved rearward from its forward home position, as shown in FIG. 3. As a result, the supporting pins 11 are inserted into the leading ends of the pipes 16.

Figure 4:
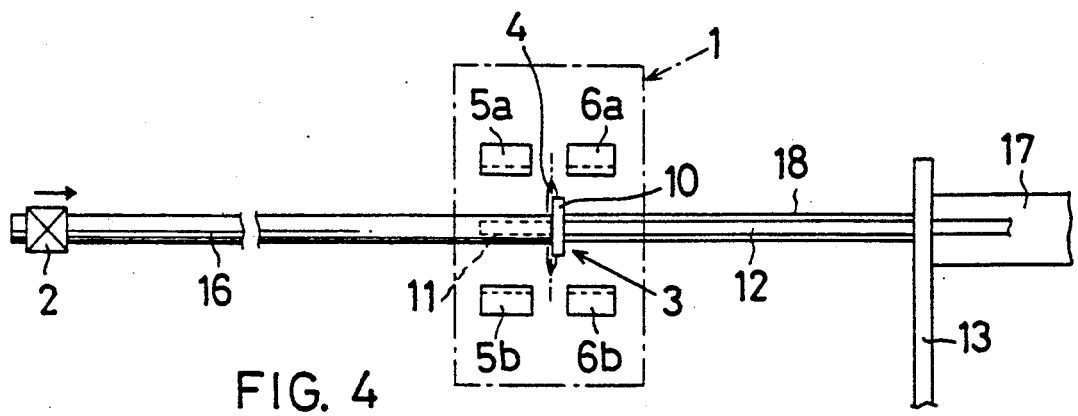
FIG. 4 is a still further side elevation showing the apparatus with its clampers being in such a state that all of clamping members of the clampers are apart from outer surfaces of the pipes.
Figure 5:
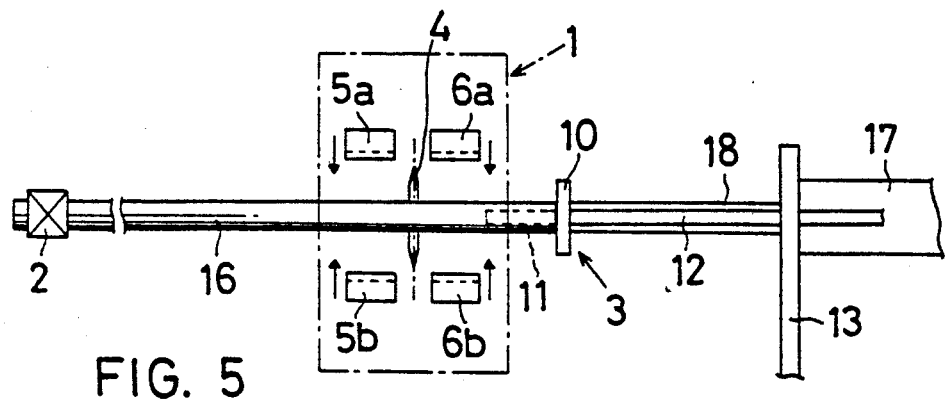
FIG. 5 is another side elevation showing the apparatus with the pipes displaced forward.

Then, as shown in FIG. 4, the upper and lower clamping members 5a and 5b of the rearward clamper 5 are separated from the pipes 16. Thus, the pipes 16 become to be supported only by the chuck 2 and the supporting pins 11, being made out of contact with the clampers 5 and 6.

Figure 6:
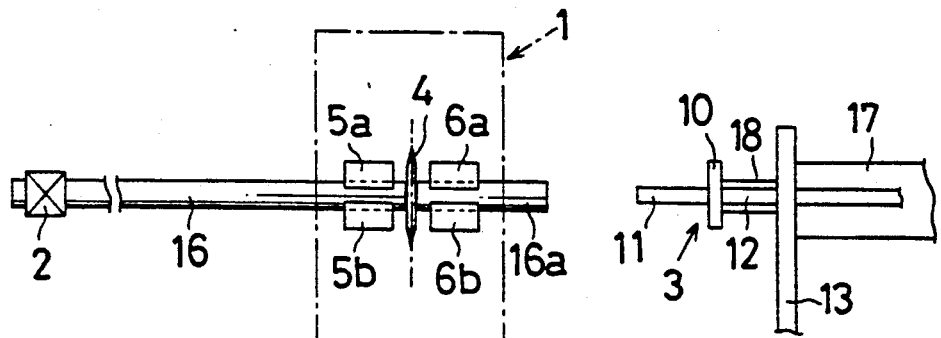
FIG. 6 is still another side elevation showing the apparatus with the pipes clamped by the clampers and cut by a cutting blade.
Figure 7:
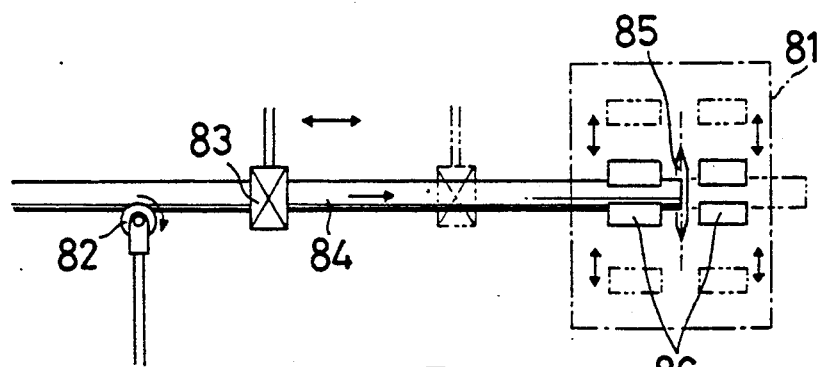
FIG. 7 is a side elevation showing a prior art apparatus for cutting pipes.

As shown in FIG. 6, the chuck 2 is subsequently caused to advance forward to thereby displace the leading ends of the pipes 16 a distance corresponding to a cut length thereof. During such a movement of the pipes, the piston rod 18 of the pneumatic cylinder 17 remains free so that said rod and the supporter 3 are pushed forward with the base plate 10 being pushed by the pipes 16. Alternatively, the supporter 3 may be driven forward in unison with the chuck 2.

Next, the cutting blade 4 is operated to cut pipes 16 held by the clampers 5 and 6. Before cutting the pipes, the lower clamping members 5b and 6b of the clampers 5 and 6 are raised at first to support the pipes 16, and upper clamping members 5a and 6a are lowered after the supporting pins 11 have been removed from the pipes 16. Alternatively, the supporting pins 11 may be pulled out of the pipes after all the clamping members have been set to hold the pipes 16 in position, or may be kept in the pipes while they are being cut.

Shortened pipes 16a which have been cut into pieces of the predetermined length in this manner will be discharged from the apparatus and delivered to the next process. The upper clamping member 6a of the forward clamper 6 is retracted to its upper home position, while the lower clamping member 6b is reset to its lower home position. On the other hand, the supporter 3 moves rearward again to insert its supporting pins 11 into leading ends of the remaining pipes 16. These steps will be repeated to successively cut the elongate pipes 16 until the chuck 2 will be positioned in close proximity to the main body 1 of the metallic pipe-cutting apparatus. After such a cutting operation is finished, the chuck 2 is disengaged from the remaining pipes so as to allow them to be removed from the chuck, while the chuck is retracted to its original position. The cutting operation may be continued in the same manner as described above.

It will now be apparent that in the metallic pipe-cutting apparatus in the invention the chuck always clamps the trailing ends of the pipes which are repeatedly caused to advance the predetermined distance so that scratches or flaws are produced only at the trailing ends of the pipes due to fixed contact with the chuck. In other words, there is no fear of damaging such a wide range of the pipe surfaces as in the prior art apparatus. Further, the supporting pins which are inserted in the leading ends of the pipes do not cause any surface scratch or flaw on the outer surface of the pipes. Similarly, the clampers which are kept apart from the pipes while they are being moved will not bring about the scratches which would otherwise be caused by the sliding contact of the clampers with the pipes. The metallic pipe-cutting apparatus in the invention can thus offer the cut pipes of any predetermined length, which pipes are severed from the elongate pipes without scratching or flawing them.

The shortened pipes severed by the apparatus in the invention from the elongate metallic drawn pipes are suited for use as for instance the base bodies of photosensitive drums which are to be of a high precision as to their surface quality as mentioned hereinbefore. Yield of acceptable products in producing such cut pipes is also improved in the invention because the apparatus does not cause any unacceptable flaws to the pipes.

What is claimed is:

1. A pipe cutting apparatus comprising: a main body including a pair of forward and rearward clampers which are disposed forwardly and rearwardly of a cutting tool, respectively; a chuck of such a structure as to hold trailing ends of elongate pipes and disposed rearwardly of the main body and movably fore and aft; and a supporter disposed forwardly of the main body so as to face the chuck with the main body interposed between the chuck and the supporter, the supporter being movable fore and aft and including supporting pins which protrude rearward so as to be inserted in leading ends of the pipes when the supporter is moved rearward from its forward home position, wherein the apparatus is controlled in such a manner that the supporter is actuated to move the supporting pins rearward from their home position to their pipe-supporting position while the pipes are held in place between the chuck and the rearward clamper, the rearward clamper being subsequently operated to come out of contact with outer surfaces of the pipes before the chuck is moved forward a predetermined distance, and then the forward and rearward clampers cooperate to hold the pipes so as to allow the cutting tool to cut the pipes.

2. A pipe cutting apparatus in accordance with claim 1, wherein the supporter comprises a base plate having a back surface from which the supporting pins protrude rearward.

3. A pipe cutting apparatus in accordance with claim 2, wherein the supporter further comprises guide rods protruding forward from a front surface of the base plate so as to penetrate a fixed frame disposed forwardly of the supporter, the guide rods being slidably supported by the fixed frame.

4. A pipe cutting apparatus in accordance with claim 3, further comprising a pneumatic cylinder connected to a front surface of the fixed frame, the pneumatic cylinder comprising a piston rod penetrating the fixed frame and secured to the front surface of the base plate, with the supporter being driven fore and aft by the pneumatic cylinder.

5. A pipe cutting apparatus in accordance with claim 1, wherein the chuck and the clampers in the main body are shaped to simultaneously hold a plurality of the pipes, and the number of the supporting pins corresponds to the number of the pipes which are simultaneously held, with the supporting pins being disposed corresponding to the chuck and the clampers.

* * * * *